United States Patent
Whitehurst et al.

(10) Patent No.: US 8,163,058 B2
(45) Date of Patent: Apr. 24, 2012

(54) AMINO ALCOHOL SOLUTIONS OF N-(N-BUTYL)THIOPHOSPHORIC TRIAMIDE (NBPT) AND UREA FERTILIZERS USING SUCH SOLUTIONS AS UREASE INHIBITORS

(75) Inventors: Garnett B. Whitehurst, New Bern, NC (US); Brooks M. Whitehurst, New Bern, NC (US)

(73) Assignee: Whitehurst Associates, Inc., New Bern, NC (US)

( * ) Notice: Subject to any disclaimer, the term of this patent is extended or adjusted under 35 U.S.C. 154(b) by 0 days.

(21) Appl. No.: 13/135,305

(22) Filed: Jun. 30, 2011

(65) Prior Publication Data

US 2011/0259068 A1    Oct. 27, 2011

Related U.S. Application Data

(62) Division of application No. 12/378,499, filed on Feb. 17, 2009.

(51) Int. Cl.
*C05D 9/02* (2006.01)
*C05F 11/00* (2006.01)
*A01N 25/00* (2006.01)
*C07F 9/22* (2006.01)
*C07F 9/28* (2006.01)

(52) U.S. Cl. .......... 71/11; 71/1; 71/27; 71/64.1; 71/902; 564/12

(58) Field of Classification Search .......... 71/1, 11, 71/24–64.13, 902; 252/380, 364; 564/12–15, 564/153
See application file for complete search history.

(56) References Cited

U.S. PATENT DOCUMENTS

| | | |
|---|---|---|
| 3,152,039 A | 10/1964 | Mattson |
| 3,353,949 A | 11/1967 | Nau |
| 4,530,714 A | 7/1985 | Kolc et al. |
| 5,024,689 A | 6/1991 | Sutton et al. |
| 5,352,265 A | 10/1994 | Weston et al. |
| 5,364,438 A | 11/1994 | Weston et al. |
| 5,698,003 A | 12/1997 | Omilinsky et al. |
| 6,830,603 B2 | 12/2004 | Whitehurst et al. |
| 2004/0163434 A1 | 8/2004 | Quin |
| 2006/0185411 A1 | 8/2006 | Hojjatie et al. |
| 2007/0077428 A1* | 4/2007 | Hamed et al. .......... 428/393 |
| 2007/0157689 A1 | 7/2007 | Sutton et al. |
| 2007/0295047 A1 | 12/2007 | Sutton et al. |

FOREIGN PATENT DOCUMENTS

WO    WO 2008/000196    1/2008

* cited by examiner

*Primary Examiner* — Jerry Lorengo
*Assistant Examiner* — Jennifer Smith
(74) *Attorney, Agent, or Firm* — MacCord Mason PLLC

(57) ABSTRACT

A method of producing reduced volatility of urea fertilizers comprising: dissolving N-(n-butyl)-thiophosphoric triamide (NBPT) in an amino alcohol having the formula 1—$(H)_x$—N—$((CH_2)_m$—$OH)_n$ where m is 1-3, x is 0 or 1, and n is 2 when x is 1 and 3 when x is 0: or the formula 2—$(H)_y$—N—$((CH_2)$—CHOH—$CH_3)_z$ such that the length of the carbon chain where the secondary hydroxyl group is located is 3, y is 0 or 1, and z is 2 when y is 1 and 3 when y is 0 to form an NBPT solution; and combining a urea fertilizer in granular or liquid form with the NBPT solution.

16 Claims, No Drawings

AMINO ALCOHOL SOLUTIONS OF N-(N-BUTYL)THIOPHOSPHORIC TRIAMIDE (NBPT) AND UREA FERTILIZERS USING SUCH SOLUTIONS AS UREASE INHIBITORS

This application is a divisional of U.S. patent application Ser. No. 12/378,499, filed Feb. 17, 2009, which is incorporated herein by reference in its entirety.

BACKGROUND OF THE INVENTION (1) Field of the Invention

Fertilizer materials derived primarily from urea with other additional useful additives and plant nutrient materials are treated with a solution of N-(n-butyl) thiophosphoric triamide (NBPT) dissolved in one or more amino alcohols to reduce nitrogen volatilization. The solution may be applied as a coating for granular urea fertilizers, or mixed with an aqueous fertilizer solution.

(2) Description of the Prior Art

The degradation of urea to release ammonia when applied to the soil is well known. The losses of applied nitrogen due to volatilization can be substantial (see review by Terman "Volatilization Losses of Nitrogen as Ammonia from Surface Applied Fertilizers, Organic Amendments and Crop Residues" in Advances in Agronomy 31: 189-223, 1979). The losses of nitrogen from urea applied to the soil are dependent upon a number of factors including: soil pH, soil temperature, soil moisture, cation exchange capacity of the soil and soil organic matter content. Greater losses of nitrogen from urea are observed as the soil temperature increases, as the soil pH increases and as the organic matter content increases. Decreased nitrogen losses of nitrogen from urea are observed whenever the soil moisture is high. In addition the depth of fertilizer placement influences nitrogen losses and surface placements are generally subject to greater nitrogen loss. The relative humidity at time of fertilization can influence losses. Recent rainfall events will tend to reduce losses if sufficient water is present to distribute the fertilizer into the soil.

Methods for controlling volatile nitrogen loses from urea have included the application of metal salts of copper and zinc, boron compounds, organic urease inhibitors, acid coatings, polymer coatings, and reaction of urea with aldehydes to form a slow release molecular adduct (see background in Whitehurst. et. al. U.S. Pat. No. 6,830,603 which is incorporated by reference). A number of extended release products have been proposed to help control volatile nitrogen losses.

N-(n-butyl)-thiopsosphoric triamide (NBPT) is a known urease inhibitor described by (Kolc et. al. U.S. Pat. No. 4,530,714). The compound is a waxy solid with poor water solubility making it difficult to coat urea and achieve adhesion of the compound. The compound undergoes hydrolysis and is thermally unstable.

The 714 patent describes the mixing of NBPT with organic solvents (acetone, disobutylketone, methanol, ethanol, 2-propanol, ether (diethyl), tolune, methylene chloride) to distribute the compound into the soil in an effective concentration range which can be anywhere from 5 ppm to 100 ppm depending upon the soil. The organic solvents described by the 714 patent are either too flammable for use or pose significant health risks to be considered suitable for coating urea granules.

In an alternate method the 714 patent indicates that NBPT can be mixed with solids such as gypsum or clay to distribute the compound into the soil in an effective concentration.

Omilinsky et. al. (U.S. Pat. No. 5,698,003) describes the dissolution of NBPT with a glycol such as propylene glycol or ethylene glycol and esters of glycols. Glycols are compounds with adjacent alcohol groups in the chemical structure. The dissolution may contain a co-solvent liquid amide such as N-methyl-2-pyrrolidine and potentially a surfactant or dispersing agent such as polyethylene glycol or esters of polyethylene glycol (polyether alcohols). The patent indicates that esters of glycerol (a triol) may be used as the base solvent. Urea granules containing NBPT are prepared by mixing the urea granules with the NBPT dissolution solvent. Omilinsky et. al. teach that a drying agent such as clay or gypsum may be added to the compositions in the event that a product with excessive wetness is obtained.

Weston et. al (U.S. Pat. No. 5,352,265 and U.S. Pat. No. 5,364,438) teach the dissolution of NBPT in liquid amides such as 2-pyrrolidone or N-alkyl-2-pyrrolidones such as N-methyl-2-pyrrolidone to prepare both solid urea formulations (265 patent) or liquid formulations (438 patent).

Hojjatie et. al. (US 2006/0185411) teach the use of a number of sulfur salts of calcium or magnesium (calcium polysulfide, thiosulfate, magnesium thiosulfate) as urease inhibitors to prepare granular or liquid urea compositions.

Quin (US 2004/0163434) teaches the formation of a sulfur coated urea which may contain the urease inhibitor NBPT supplied from a proprietary liquid formulation sold as Agrotain® and distributed by Agrotain International LLC, Indiana, USA.

Sutton et. al. (U.S. Pat. No. 5,0247,689) teach the formation of a liquid fertilizer that includes urease inhibitors such as NBPT and nitrification inhibitors such as dicyandiamide in aqueous mixtures of urea ammonium polyphosphate, ammonium thiosulfate and potentially other plant growth improving compounds.

Sutton (US 2007/0295047) teaches the formation of a solid fertilizer comprised of urea and a urea-formaldehyde polymer which may additionally include a urease inhibitor such as NBPT.

Sutton et. al. (US 2007/0157689) describes a fertilizer additive composed of urea, a urea-formaldehyde polymer and NBPT dissolved in an N-alkyl-2-pyrrolidone.

Urea is a high nitrogen analysis material which is often desirable as a starting material for making additional fertilizer products providing phosphorus or potassium as primary nutrients, calcium, magnesium or sulfur as secondary nutrients or micronutrients such as boron, copper, iron, Manganese, molybdenum and zinc.

Whitehurst et. al. (603 patent) describe a coating methodology wherein a boron containing urease inhibitor composition may be used to add additional nutrients such as phosphate, potassium, etc. The coating of urea with other materials is known and the references in Whitehurst et. al. (603 patent) provides a partial summary of prior art in the area. The inhibitors and binders of this invention are aqueous mixtures that include ethanolamine borates, diethanolamine borates or triethanolamine borates and mixtures of these.

Commercial products containing aqueous ethanolamine borates or triethanolamine borates are distributed under the trade name of ARBORITE® by Encee Chemical Sales, North Carolina, USA. The product is further identified by a binder number for separation of the different mixtures available.

SUMMARY OF THE INVENTION

Generally, reduced volatility urea fertilizers are prepared in accordance with the present invention by first preparing an N-(n-butyl)-thiophosphoric triamide (NBPT) solution by dissolving NBPT in an amino alcohol having the formula 1— $(H)_x$—N—$((CH_2)_m$—$OH)_n$ where m is 1-3, x is 0 or 1, and n is 2 when x is 1 and 3 when x is 0: or the formula 2—$(H)_y$—N—$((CH_2)—CHOH—CH_3)_z$ such that the length of the carbon chain where the secondary hydroxyl group is located is 3, y is 0 or 1, and z is 2 when y is 1 and 3 when y is 0. The solution is then combined with a urea fertilizer in granular or liquid form.

As used herein, the term "urea fertilizer" encompasses urea and mixtures of urea with other primary nutrients, secondary nutrients and/or micronutrients. Preferably, urea comprises at least 40% by weight of the urea fertilizer. Unless otherwise noted all percentages refer to weight percentages or parts per 100 parts. NBPT-N-(n-butylthiophosphoric triamide) is an item of commerce and is sold in various forms which may contain impurities.

The requirements for the dissolution of NBPT as a successful formulation to inhibit urease when used to prepare urea containing products either granular or liquid include: an organic molecule which is a liquid or easily liquefied with high water solubility, the presence of an alkaline functional group that limits hydrogen sulfide formation when the NBPT is exposed to water and some degree of polar character such as that of an alcohol group to enhance water solubility. It is desirable that the solvent system chosen have low flammability.

The compounds described in this invention as solvents for NBPT may be broadly described as amino alcohols (sometimes called alkanol amines). The alcohol portion of the carbon chain attached to the nitrogen may have various lengths provided that the alcohol containing carbon chain is attached to nitrogen in such a manner as to form a secondary or a tertiary nitrogen atom. It is a further requirement that all carbon chains attached to the nitrogen atom possess an alcohol group.

Specifically the compounds have the formula 1—$(H)_x$—N—$((CH_2)_m—OH)_n$ where m is 1-3, x is 0 or 1, and n is 2 when x is 1 and 3 when x is 0. The hydroxyl groups of the compound are located at the opposite end of the carbon chain from the nitrogen atom.
Structures meeting the structural definition include:
azanediyldimethanol (dimethanolamine)
2,2'-azanediyldiethanol (diethanolamine) (2,2'-iminobisethanol)
3,3'-azanediyldipropan-1-ol (dipropanolamine)
nitrilotrimethanol (trimethanolamine)
2,2',2"-nitrilotriethanol (triethanolamine) (trihydroxytriethylamine)
3,3',3"-nitrilotripropanol (tripropanolamine)

An additional class of structures may contain secondary alcohol groups and can be described by the formula 2—$(H)_y$—N—$((CH_2)—CHOH—CH_3)_z$ such that the length of the carbon chain where the secondary hydroxyl group is located is 3, y is 0 or 1, and z is 2 when y is 1 and 3 when y is 0. Structures meeting the structural definition include:
1,1'-azanediyldipropan-2-ol (diisopropanolamine) (1,1'-iminobis-2-propanol)
1,1',1"-nitrilotripropan-2-ol (triisopropanolamine)

The following amino alcohols (alkanol amines) required to practice the invention are items of commerce: diethanolamine and triethanolamine which may be obtained as substantially pure compounds (>95% purity) or as mixtures including ethanolamine, diethanolamine and triethanolamine in various proportions; and diisopropanolamine which, also, may be obtained in substantially pure form.

The term solubility limit as used below refers to the measurement of the maximum amount of NBPT which will dissolve in an amino alcohol solvent as defined above or mixture of amino alcohols solvents as defined above. To determine the solubility limit, a mixture is prepared by melting a weighed amount of solid NBPT into weighed amount of the liquid (or mixture of liquids) to reach the desired concentration. The melting requires a temperature from about 50° C. to about 60° C. The resulting cooled NBPT containing mixture is observed over a period of time after cooling to watch for solid formation. If solids form upon standing the mixture is deemed unstable and the solubility limit is considered exceeded.

The term combined aqueous solubility limit as used below refers to the maximum amount of NBPT containing amino alcohol solvent as described above which can be mixed with another aqueous liquid material before solid formation occurs. The limit will depend upon the NBPT concentration of the amino alcohol solvent used to mix with another aqueous liquid material. All solubility limits are expressed in weight percentages and are understood to imply the limit of the solubility of NBPT.

Additionally, the practice of the invention may include other items of commerce including ethylene glycol and propylene glycol. The glycols can be used as co-solvents or as agents to reduce viscosity of various mixtures to control spreadability of a formulation.

The production of some coated products may also include one or more sources of additional plant nutrients as water soluble salts such as potassium chloride, potassium sulfate, and salts of iron, copper, zinc, manganese, and others; and partially water soluble salts such as gypsum, potassium magnesium sulfate and others commonly employed in agricultural practice. The only requirement for the selection of the additional plant nutrient source is that it be compatible with urea. Compatibility of many fertilizer materials can be determined from the "Farm Chemicals Handbook" published by Meister Publishing Co. Ohio, USA.

To make mixed fertilizer compositions using the invention, one or more materials providing plant nutrients other than urea are preferably used in a powdered form. The term powder for purposes of the invention shall mean any finely divided substance prepared by some dry grinding process. There are numerous forms of dry grinding equipment available including hammer mills or pin mills, etc. A powder for purposes of the invention shall imply any finely divided material with a particle size less than 0.300 mm (300 μm).

Mixed fertilizer compositions are described by expressing the weight percentage of the primary elements present in the following manner: XX—YY—ZZ; where XX is the percentage of nitrogen, YY is the phosphate percentage expressed as $P_2O_5$, and ZZ is the potassium content expressed as the percentage $K_2O$. When secondary elements are present the percentages are often listed after the primary elements in the order calcium, magnesium and sulfur or by stating the analysis for the secondary element followed by the symbol for the element. For example a 35-9-0-2Ca-2Mg, -3S would indicate a material (fertilizer) with 35% nitrogen, 9% $P_2O_5$, 0% $K_2O$, 2% Ca, 2% Mg and 3% S.

DETAILED DESCRIPTION OF THE INVENTION

To practice the invention, NBPT is dissolved in an amino alcohol solvent (or mixture primarily composed of an amino alcohols) as described above meeting requirements needed to dissolve NBPT to prepare urea containing compositions that include this valuable urease inhibitor. The dissolution step for NBPT is preferably carried out by melting NBPT into the solvent or solvent mixture at a temperature from about 50° C. to 60° C.

In the preferred embodiment of the invention, an NBPT containing mixture is formed by mixing NBPT with an amino alcohol solvent as defined above sufficient to give a concentration from 2% to 40% % by weight depending upon the solubility of limit of NBPT in the amino alcohol solvent.

The melting step may be accomplished using jacketed vessels or heating coils provided that the melt is swept away from the heat source by stirring the mixture as it forms using an agitator or circulation pump to prevent a localized hot spot from forming. The melting step is preferably performed using hot water to avoid thermal damage to the NBPT. Steam may be used;

however, both rapid circulation while mixing and temperature controls should be employed to reduce thermal degradation of NBPT.

To assist in the formulation processes described below, a dye or colorant can be added to the amino alcohol solvent containing mixture. Any commonly used colorant including food dyes may be added to the mixture to provide visual evidence of the uniformity of the distribution of the amino alcohol solvent containing NBPT as described below. Methylene blue is a commercially available blue colored substance which could be dissolved in water or alcohol to add to the NBPT amino alcohol solvent mixture.

Once NBPT is dissolved in an amino alcohol solvent or mixtures as described above with or without a colorant, useful compositions can be obtained by contacting granular urea with the NBPT amino alcohol solvent mixture. Coated granular urea containing products with from 0.010% to 0.25 NBPT can be made which have applications in agriculture or forestry where nitrogen fertilization is needed.

The amount of urease inhibitor (NBPT) needed in given coated urea formulation often depends upon the soil type and soil pH and the amount of urease activity due to soil bacteria. The quantity of urease inhibitor needed in the final granular product treated with the amino alcohol solvent containing NBPT could be determined by measuring the urease activity in a range of soils and then determining the amount of inhibitor needed to inhibit that amount of urease in the specific soil where the coated products will be applied. The alternative method involves assessing the volatile nitrogen losses from a range of soils and formulating to achieve a desired amount of control of the volatile nitrogen loss in the specific soil where the coated products will be applied. The practices for measuring urease inhibition or volatile nitrogen losses are described in the patents or literature referenced above.

The coating of granular urea with NBPT dissolved in an amino alcohol solvent of the invention may be accomplished using any commercially available equipment in which a granular product may be commingled with a liquid. The equipment may permit the amino alcohol solvent liquid containing NBPT to be sprayed onto the granules as they tumble in the mixer or the amino alcohol solvent liquid containing NBPT may be dribbled into the granules as they tumble within the mixing equipment. The surface wetted granules from addition of the amino alcohol solvent containing NBPT are then tumbled until the material has been uniformly distributed across the surface of the granules. The resulting NBPT treated urea product may then be stored or packaged as required. A flowability aid or desiccant such as gypsum, silica, monoammonium phosphate, potassium sulfate, potassium magnesium sulfate or clay may be required to ensure flowability of the resulting coated granular product if there is inadequate control of the volume of NBPT containing amino alcohol solvent liquid applied to the coating. Preferably, the amino alcohol solvent liquid containing NBPT is introduced into the mixing equipment via a metering system able to provide reproducible formulations.

Once the NBPT coated granular urea product has been prepared, the product may be applied to land to provide nitrogen needed by plants to the soil which contain the valuable urease inhibitor NBPT. The granular product materials containing NBPT may be applied using any routinely used application method such as broadcast by ground or aerial spreading equipment, banding using ground application equipment and spotting techniques wherein the fertilizer is placed next to the plant either above ground or in a depression made into the soil surface next to the plant where application is desired.

Another useful set of urea containing formulations may be obtained by adding the amino alcohol solvent containing NBPT to aqueous solutions which contain urea. Commercially available UAN solution a mixture of urea and ammonium nitrate that may contain from about 28% N to 32% N can be mixed with the amino alcohol solvent containing NBPT. The mixing of the NBPT containing amino alcohol solvent with the UAN solution may be accomplished in any commonly used mixing equipment. Once the NBPT containing amino alcohol solvent mixture with UAN is prepared it may be applied to the soil as conventionally practiced for UAN solution without the NBPT containing amino alcohol solvent.

Another useful set of granular products may be prepared by diluting the NBPT containing amino alcohol solvent mixture with another liquid which may be an aqueous mixture. The resulting diluted NBPT containing mixture can then be used to cause powdered plant nutrient supplying materials to adhere to granular urea. Dilution of the NBPT present in the amino alcohol solvent may be required to avoid using an excessive amount of NBPT in the resulting coated granular products to avoid potential phytotoxicity.

To prepare the diluted NBPT containing mixture, the amino alcohol solvent containing NBPT can be measured into the diluting material on a weight or volumetric basis. Any order of addition of the ingredients may be used. The maximum amount of NBPT is limited by solubility limit for NBPT in the diluted mixture or aqueous solubility limit of NBPT in the diluted mixture being prepared.

The mixing of the two materials may be accomplished in any commonly used method: for example; simply tank mixing the two materials prior to use, using a metering system to inject both materials simultaneously, or mixing via a spray injection system if the binder was normally sprayed onto a granular bed to prepare coated urea products.

When the diluent liquid contains an aqueous ethanolamine borate such as ARBORITE® Binder 75, it is critical that the concentration of the secondary or tertiary amino alcohol be kept above about 12% and preferably above about 20%. Below a 12% concentration of the secondary or tertiary amino alcohol in an ethanolamine borate solution a suspension of NBPT in the aqueous mixture may form which requires constant agitation to be used to prepare other products.

Coated granular urea products containing additional plant nutrients are then prepared from granular urea, a source or sources of the additional nutrients in powdered form and the diluted NBPT containing mixture described above. Granular urea is first dampened with the diluted NBPT containing mixture followed by mixing to distribute the NBPT containing liquid mixture over the granular urea surface using any commonly used equipment to comingle a liquid with a granular solid. After distribution of the diluted NBPT containing mixture over the granular surface, the additional nutrients in powdered form are added to the dampened mixture and the resulting combined ingredients are further mixed to distribute the powdered materials. In an alternate approach the powdered materials may be first mixed with the granular urea and then the NBPT containing diluted mixture is sprayed onto a tumbling bed of the dry ingredients to agglomerate the dry materials. This later method is particularly suited to continuous processing.

As an embodiment of the invention, NBPT is dissolved by melting the compound with sufficient triethanolamine to provide a mixture with up to about 30% by weight of NBPT. The resulting NBPT mixture in triethanolamine can be used to treat urea as described above.

In another embodiment of the invention, NBPT is dissolved in diethanolmaine in an amount up to 40% by weight by melting the solid into diethanolamine until a solution is obtained. The NBPT diethanolamine mixture may be used to treat urea as described above.

In another embodiment of the invention, a liquid mixture of diisopropanolamine may be prepared by gently warming the solid until it has liquefied and the mixing NBPT with the solid up to the solubility limit. The liquid NBPT containing mixture in disioproanolamine may be used to treat urea as described above.

In another embodiment of the invention, a commercially available mixtures of diethanolamine, triethanolamine with less than 5% monoethanolamine may be used to dissolve NBPT up to the solubility limit. The NBPT containing mixture in the amino alcohol solvent mixture may be used to treat urea as described above.

In another embodiment of the invention, a mixture of diisopropanolamine containing up to 20% ethylene glycol or 20% propylene glycol may be prepared by mixing diisopropanolamine with either glycol and warming if needed to aid dissolution. The NBPT containing mixture of diisopropanolamine with glycol may be used to treat urea as described above.

In another embodiment of the invention, diethanolamine, triethanolamine singly or as mixtures containing up to 5% monoethanolamine, may be prepared with up to 20% ethylene glycol or 20% propylene glycol by mixing the amino alcohol with either glycol and warming if needed to aid dissolution. NBPT is then dissolved in the resulting amino alcohol glycol mixture. The NBPT containing mixture of amino alcohols and glycols may be used to treat urea as described above.

In another embodiment of the invention, a solution containing up to about 2.0% by weight NBPT can be dissolved in the triethanolamine borate mixture such as ARBORITE® Binder 78. The resulting mixture could then be used to prepare coated urea granules with both NBPT and a boron compound present as described above.

As another embodiment of the invention, a mixture containing up to about 3% NBPT can be made mixing a 20% solution of NBPT dissolved in triethanolamine with UAN solution to give a final concentration of NBPT of about 3%. Preferably the concentration of NBPT in the UAN solution would range from about 0.05% to about 0.25% by weight. The liquid formulation may then used directly as a fertilizer solution.

In another embodiment of the invention, a solution containing up to about 15% by weight NBPT can be dissolved in triethanolamine can be diluted with ARBORITE® Binder 75 (an aqueous ethanolamine borate solution containing copper). The final diluted mixture containing NBPT in ARBORITE® Binder 75 is most stable (absence of significant suspended solids) when the triethanolamine concentration (by weight) of the final mixture is above 20% by weight. When the triethanolamine content of the final mixture is below 12% a suspension forms which can be used only with constant agitation.

The resulting mixture could then be used to prepare coated urea granules with NBPT, boron and optionally other plant nutrients as indicated above.

EXAMPLES

The following examples are provided to illustrate the practice of the invention. The examples are not intended to illustrate the complete range of uses possible.

Example 1

The solubility of NBPT in various solvents according to the invention is shown in table 1.

TABLE 1

| Solubility of NBPT in Various Compounds | | | | | |
|---|---|---|---|---|---|
| | Percentage NBPT in Solvent (weight basis) | | | | |
| Solvent | 5% | 10% | 20% | 30% | 50% |
| Glycerol | N (less than 5%) | | | | |
| 70% Aqueous Sorbitol | N (less than 5%) | | | | |
| Ethanolamine | Y | N | N | N | N |
| Diethanolamine | Y | Y | Y | Y | N |
| Triethanolamine | Y | Y | Y | Y | N |

Solubility limits were determined by melting weighed amounts of NBPT into the amino alcohol solvent, cooling the resulting mixture and observing the mixture over time to determine whether solids formed. For example, to prepare 10% NBPT dissolved in triethanolamine 10.0 grams of NBPT was mixed with stirring with 90.0 grams of triethanolamine and the mixture heated to about 50° C. until all solid dissolved. The mixture was then cooled and observed to assess whether solid formation occurred.

The ployols (glycerol and aqueous sorbitol) have very little ability to dissolve NBPT. Only dilute solutions of NBPT can be prepared with ethanolamine which is a primary amine. The secondary amine of diethanolamine will dissolve up to about 40% NBPT (data not shown).

Example 2

A mixture containing 9.1% NBPT in triethanolamine was prepared by mixing 9.1 g of NBPT with 91.0 grams of triethanolamine at room temperature.

Example 3

The NBPT containing mixture of example 2 was used to prepare NBPT containing coated urea granules in the range from 0.04% NBPT to 0.12% NBPT. The granules were prepared by mixing the required amount of NBPT containing solvent with granular urea at room temperature in a planetary mixer until the granule surface appeared dampened with the solvent. The resulting product granules were transferred to plastic storage container to observe the coated granule behavior. The formulation information and results of the observations are shown in table 2.

TABLE 2

| Preparation and Characteristics of Coated Urea Products Prepared from a 9.1% Solution of NBPT in Triethanolamine | | | |
|---|---|---|---|
| | Percent NBPT in Product (calculated) | | |
| Materials Added | 0.040% | 0.080% | 0.11% |
| Grams Urea | 500.0 g | 500.0 g | 500.0 g |
| Grams of Solvent (9.1% NBPT) | 2.20 g | 4.40 g | 6.60 g |

TABLE 2-continued

Preparation and Characteristics of Coated Urea Products Prepared from a 9.1% Solution of NBPT in Triethanolamine

| | Percent NBPT in Product (calculated) | | |
|---|---|---|---|
| Materials Added | 0.040% | 0.080% | 0.11% |
| Flow Ability | Good | Good | Sticky |
| Time to Achieve Free Flow | <1 day | 1 day | >10 days |
| Product Nitrogen | 45.82% | 45.64% | 45.47% |

Product Samples were prepared by mixing quantities of materials indicated with a planetary mixer until all granules appeared coated. The product was placed in a plastic container and observed over time. Stickiness refers to the ability of granules to adhere to each other and other surfaces.

The product prepared from only 9.1% NBPT was too wet to use except at low doses of NBPT. This indicates the need for higher solvent concentration to reduce the over wetting of the urea granule.

Example 4

A 9.1% solution of NBPT in diethanolamine was prepared by mixing 9.1 grams of NBPT with 91.0 grams of diethanolamine at room temperature.

Example 5

A coated urea product containing 0.079% NBPT was prepared by adding 3.20 grams of a 9.1% solution of NBPT in diethanolamine to 500.0 grams of granular urea and mixing with a planetary mixer to distribute the liquid over the granules surface. The final free flowing product contained 45.64% nitrogen with 0.079% NBPT.

Example 6

A mixed composition fertilizer with an analysis of 40-0-0-2Ca-0 Mg-3 S was prepared by using ARBORITE® Binder 75, a 9.1% solution of NBPT in triethanolamine (example 2), granular urea and gypsum (calcium sulfate dehydrate). The product was made first mixing 2.50 g of a solution containing 9.1% NBPT in triethanolamine with 5.36 g of ARBORITE® Binder 75. The resulting mixture was then added to 500.0 grams of urea and distributed over the urea surface by mixing in a planetary mixer. After distribution of the NBPT containing solution, 66.50 g of gypsum powder was added. The combined materials were then mixed until all powder has stuck to the granule surface. The product was free flowing with the following chemical analysis: 40.06% N, 2.55% Ca, 3.01% S, 0.034% B, 0.05% Cu and 0.081% NBPT. The boron and copper were contained in the ARBORITE® Binder 75.

Example 5

A 20.0% (by weight) solution of NBPT in triethanolamine was prepared by mixing 20.0 grams of NBPT with 80.0 grams of triethanolamine at room temperature until all solid had dissolved. The mixture was stable.

Example 7

The 20.0% (by weight) solution of NBPT in triethanolamine of example 4 was used to prepare a mixed fertilizer composition with an analysis of 39-9-0 from ARBORITE® Binder 75, granular urea and monoammonium phosphate. 3.20 g of the 20.0% solution of NBPT was first diluted with 12.63 g of ARBORITE® Binder 75 and the resulting combined diluted mixture was added to 500.0 grams of granular urea and the material distributed over the granules surface by mixing in a planetary mixer. After distribution of the combined NBPT binder mixture 107.3 grams of monoammonium phosphate (11-52-0) was added. The combined materials were then mixed to distribute the powder over the granule surface wetted with the combined NBPT solvent and binder. A free flowing product was obtained with a chemical analysis of 39.42% N, 8.95% $P_2O_5$, 0.16% B, 0.11% Cu, and 0.103% NBPT. The boron was contained in the ARBORITE® Binder 75. Copper was present in the ARBORITE® Binder 75 and was present in the monoammonium phosphate used to make the product.

The mixture of 20% NBPT dissolved in triethanolamine precipitated when mixed with the ARBORITE® Binder 75 solution. It was determined that the solubility limit for the NBPT in the solvent triethanolamine was 15% when it was to be mixed with the aqueous amino alcohol borate containing ARBORITE® Binder 75.

Example 8

The 20% solution of NBPT in triethanolamine of Example 6 was added to UAN solution. The UAN solution was prepared by mixing 150.0 grams of ammonium nitrate, 122.6 grams of urea and 70.3 grams of water to give a 32% nitrogen containing mixture. 3.20 grams of the 20.0% NBPT dissolved in triethanolamine was added to 21.0 gram of UAN solution. The resulting final aqueous mixture contained 2.6% NBPT, and had a nitrogen content of about 28%.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A method of producing reduced volatility of urea fertilizers comprising:
    a) dissolving N-(n-butyl)-thiophosphoric triamide (NBPT) in an amino alcohol having the formula 1—$(H)_x$—N—$((CH_2)_m$—$OH)_n$ where m is 1-3, x is 0 or 1, and n is 2 when x is 1 and 3 when x is 0: or the formula 2—$(H)_y$—N—$((CH_2)$—CHOH—$CH_3)_z$ such that the length of the carbon chain where the secondary hydroxyl group is located is 3, y is 0 or 1, and z is 2 when y is 1 and 3 when y is 0 to form an NBPT solution; and
    b) combining said NBPT solution with said urea fertilizer.

2. The method of claim 1, wherein said urea fertilizer is in the form of granules and said NBPT solution is coated on said granules.

3. The method of claim 1, wherein said fertilizer granules are coated with from about 0.050% to about 0.25% NBPT.

4. The method of claim 1, wherein said urea fertilizer is an aqueous urea fertilizer solution and said NBPT solution is mixed with said aqueous solution.

5. The method of claim 1, wherein said aqueous urea fertilizer solution contains from about 0.050% to about 0.25% NBPT.

6. The method of claim 1, wherein said amino alcohol is selected from the group consisting of diethanolamine, dipropanolamine, triethanolamine, tripropanolamine, diisopropanolamine, triisopropanolamine, and mixtures thereof.

7. The method of claim 1, wherein from about 15% to about 40% by weight NBPT is dissolved in said amino alcohol.

8. A method of producing reduced volatility of urea fertilizers comprising:
   a) dissolving N-(n-butyl)-thiophosphoric triamide (NBPT) in an amino alcohol having the formula $1-(H)_x-N-((CH_2)_m-OH)_n$ where m is 1-3, x is 0 or 1, and n is 2 when x is 1 and 3 when x is 0: or the formula $2-(H)_y-N-((CH_2)-CHOH-CH_3)_z$ such that the length of the carbon chain where the secondary hydroxyl group is located is 3, y is 0 or 1, and z is 2 when y is 1 and 3 when y is 0 to form an NBPT solution; and
   b) combining a granular urea fertilizer with said NBPT solution.

9. The method of claim 8, further including the step of coating said fertilizer granules with powdered micronutrients.

10. The method of claim 8, wherein said NBPT solution is diluted with an aqueous mixture prior to addition of powdered micronutrients.

11. The method of claim 8, wherein said granular urea fertilizer with added micronutrients contains from about 0.050% to about 0.25% NBPT.

12. A method of producing reduced volatility liquid urea fertilizer comprising:
   a) dissolving N-(n-butyl)-thiophosphoric triamide (NBPT) in an amino alcohol having the formula $1-(H)_x-N-((CH_2)_m-OH)_n$ where m is 1-3, x is 0 or 1, and n is 2 when x is 1 and 3 when x is 0: or the formula $2-(H)_y-N-((CH_2)-CHOH-CH_3)_z$ such that the length of the carbon chain where the secondary hydroxyl group is located is 3, y is 0 or 1, and z is 2 when y is 1 and 3 when y is 0 to form an NBPT solution; and
   b) mixing said NBPT solution with an aqueous solution of urea fertilizer.

13. The method of claim 12, wherein said amino alcohol is selected from the group consisting of diethanolamine, dipropanolamine, triethanolamine, tripropanolamine, diisopropanolamine, triisopropanolamine, and mixtures thereof.

14. The method of claim 12, wherein from about 15% to about 40% by weight NBPT is dissolved in said amino alcohol.

15. The method of claim 12, wherein sufficient NBPT solution is mixed with said aqueous solution to produce an aqueous fertilizer containing from about 0.050% to about 0.25% NBPT.

16. The method of claim 12, wherein said urea fertilizer is an aqueous mixture of urea and ammonium nitrate.

* * * * *